Figure 1:
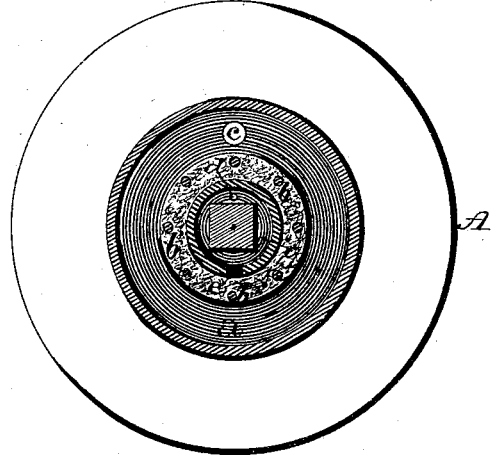

(No Model.)

H. SCHMIDT.
TROLLEY WHEEL.

No. 548,011. Patented Oct. 15, 1895.

WITNESSES:
Geo. H. Snyder
Herbert Peck

INVENTOR
Henry Schmidt,
BY E. H. Gleason
ATTORNEY.

UNITED STATES PATENT OFFICE.

HENRY SCHMIDT, OF MOLINE, ILLINOIS.

TROLLEY-WHEEL.

SPECIFICATION forming part of Letters Patent No. 548,011, dated October 15, 1895.

Application filed January 5, 1895. Serial No. 533,904. (No model.)

*To all whom it may concern:*

Be it known that I, HENRY SCHMIDT, a citizen of the United States, residing at Moline, in the county of Rock Island and State of Illinois, have invented certain new and useful Improvements in Trolley-Wheels; and I do hereby declare the following to be a full, clear, and exact description of the invention, such as will enable others skilled in the art to which it appertains to make and use the same.

My invention relates to trolley-wheels, such as are commonly used on street-cars, and also pulleys used for various manufacturing purposes.

My improvement aims to provide a wheel efficient in its working, self-oiling, avoiding the need of oil-cups and the waste of time lost by daily need of oiling.

The improvement consists of the novel features and the peculiar construction and combination of parts, which will be hereinafter more fully described and claimed, and which are shown in the drawings, in which—

Figure 2:
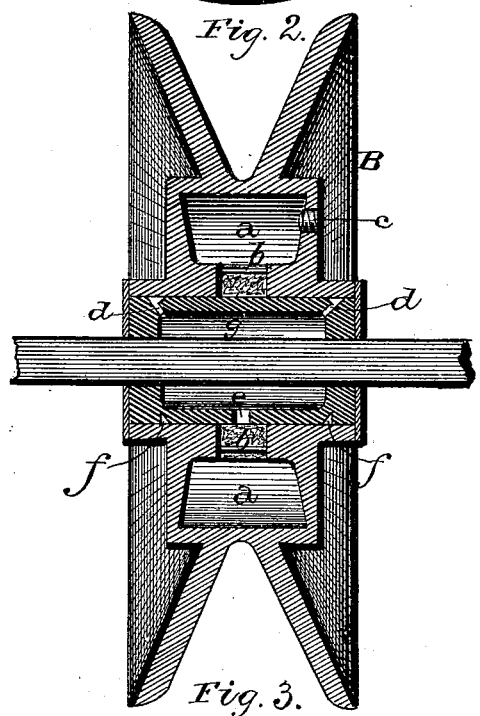
Figure 3:
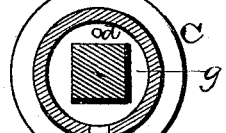
Figure 4:
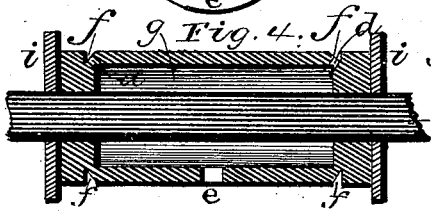

Figures 1 and 2 are vertical sections of a wheel embodying my invention, taken at right angles to each other. Figs. 3 and 4 are enlarged sections of the hub and axle, taken at right angles to each other and detached from the wheel.

Similar letters refer to similar parts throughout the different views.

Referring to the drawings, the letter $a$ represents an oil-chamber located in the hub of trolley-wheel concentric with the sleeve D and furnishing a full supply of oil to all parts needed.

$b\ b$ represent a series of bars attached at each side of the oil-chamber for the purpose of holding packing when required and preventing it coming in contact with the sleeve.

$c$ represents a plug in the web of the wheel, which may be removed at pleasure to permit the introduction of oil in the oil-chamber. An oblong slot (not shown) may be made through the hub into the oil-chamber $a$ at any point desired for the insertion and removal of packing.

Letter $h$ represents a space below the bars $b$, sufficient to allow the free flow of oil to the sleeve.

D, Fig. 4, represents the sleeve or that part on which revolves the wheel, being enlarged part of the shaft and fitted to fill the aperture through the hub, the sleeve having a space $g$ in the center thereof and grooves $ff$ on the face circling the same near the ends for the purpose of gathering the surplus oil naturally flowing to the outer ends under high velocity.

$d\ d$ are perforations on the upper side of the sleeve D, leading from the grooves $ff$, and perforations $d\ d$ lead into the space $g$, from whence the oil is carried off by the larger perforation $e$ in the under side into oil-chamber $a$.

$i\ i$ represent metal caps or washers covering on each side of the hub and ends of the sleeve, serving partially as guides and preventing the waste of oil.

Having thus described my invention, what I claim, and desire to secure by Letters Patent, is—

The wheel B provided with an oil chamber concentric to the shaft or axle, and a series of rods or bars $b$, to support the material containing the lubricant; combined with the chambered sleeve placed directly upon the shaft or axle, and upon which the wheel revolves, and which sleeve is provided with the openings $d$, $e$, and grooves $f$; the openings $d$ communicating with the portions of the wheel hub which form its bearings, and the opening $e$ at the lower side of the sleeve communicating directly with the oil chamber in the wheel, and the washers placed upon the shaft against the ends of the wheel and sleeve, a chamber being formed directly around the shaft inside of the sleeve so as to hold the lubricant that escapes from the outer chamber in direct contact with the shaft, substantially as shown.

In testimony whereof I have affixed my signature in presence of two witnesses.

HENRY SCHMIDT.

Witnesses:
L. E. HEMENWAY,
CHAS. FISCHER.